March 31, 1959  R. R. ANDERSON ET AL  2,879,964
TRANSFORMER MOUNTING APPARATUS
Filed April 10, 1957  2 Sheets-Sheet 1
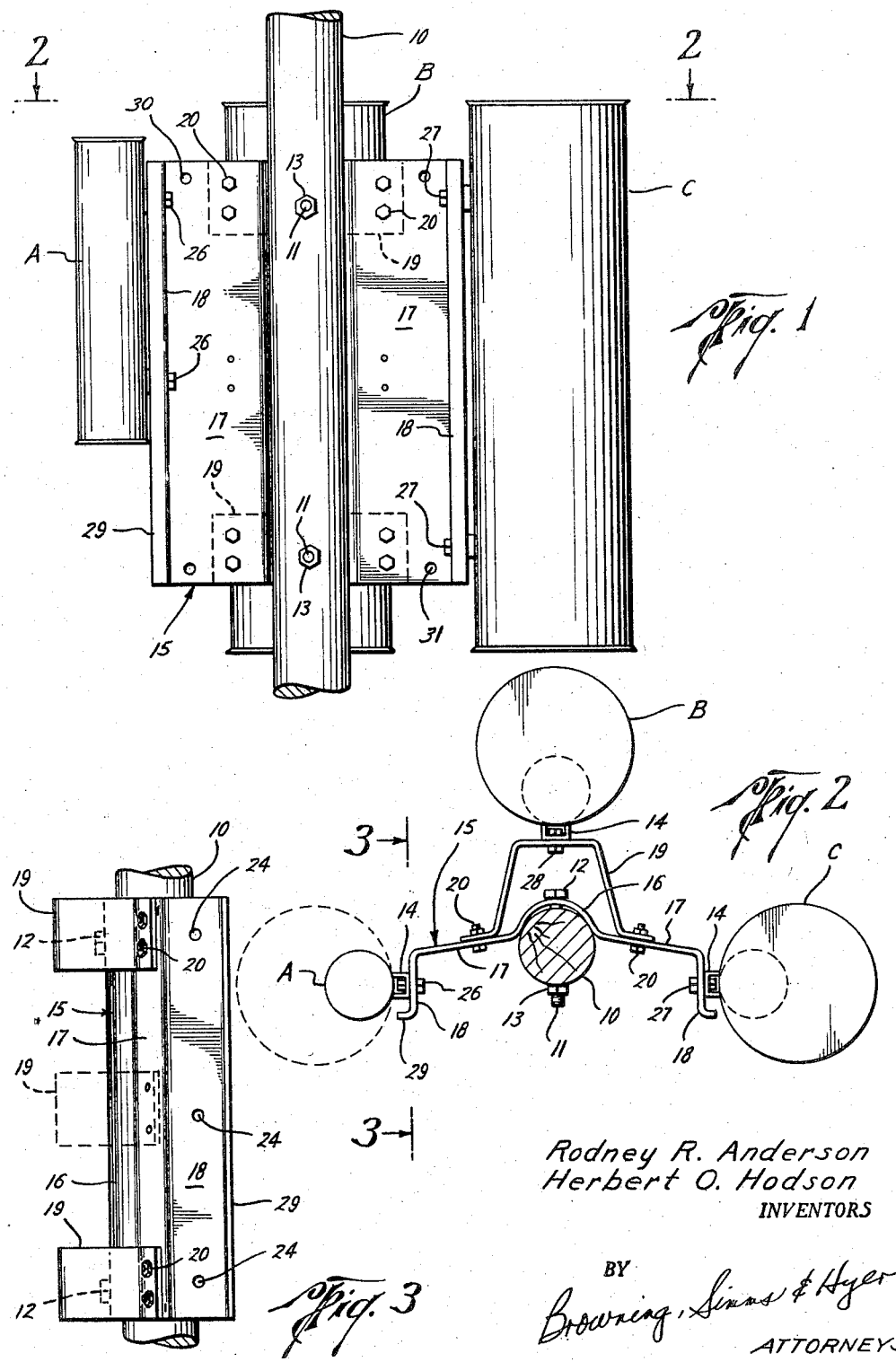
Rodney R. Anderson
Herbert O. Hodson
INVENTORS
BY
Browning, Simms & Hyer
ATTORNEYS

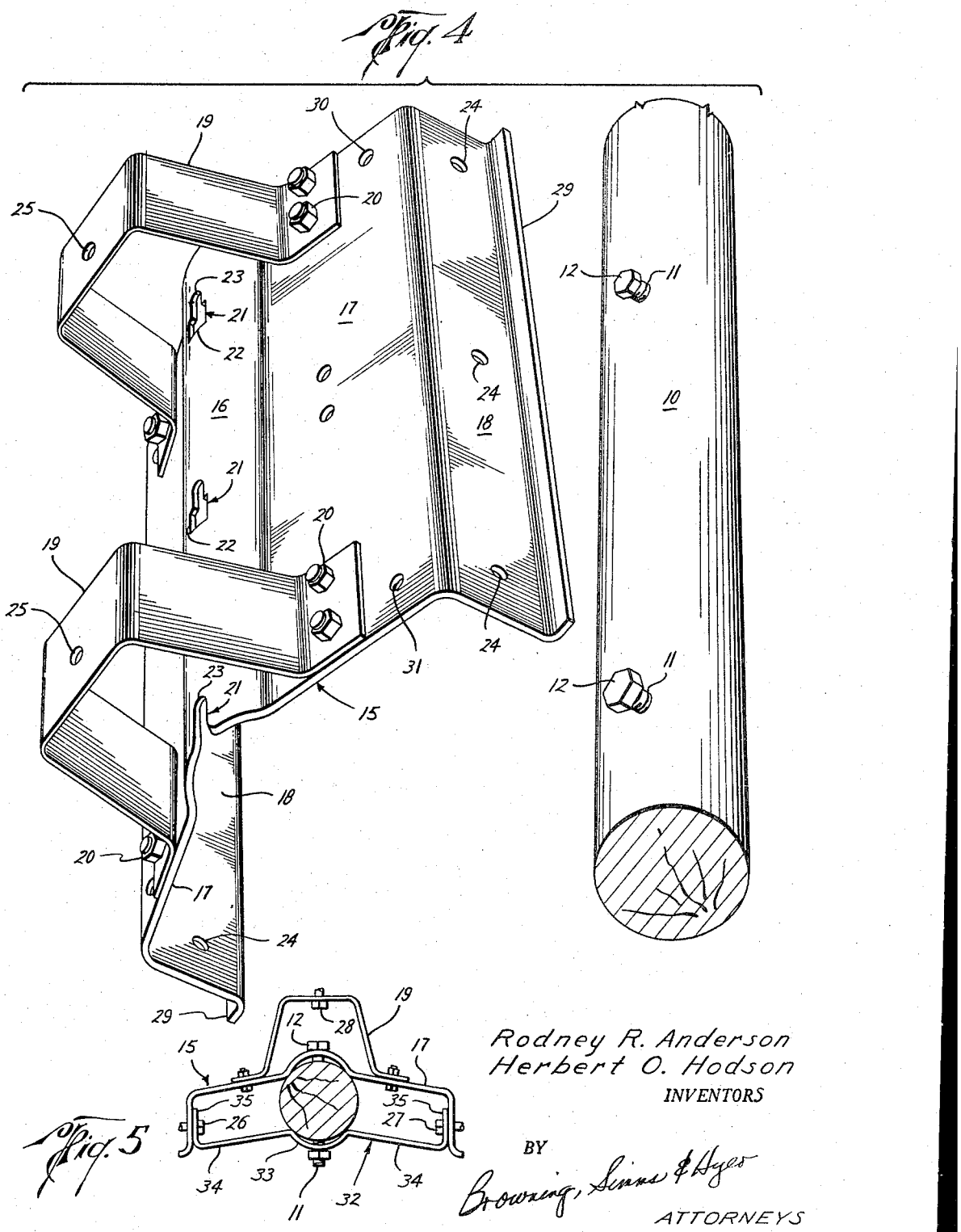

2,879,964

TRANSFORMER MOUNTING APPARATUS

Rodney R. Anderson, Houston, and Herbert O. Hodson, Amarillo, Tex.

Application April 10, 1957, Serial No. 652,048

2 Claims. (Cl. 248—221)

This invention relates to apparatus for mounting transformers or the like on a pole. More particularly, it relates to improved apparatus for use in mounting at least two, and preferably three, transformers in a group about a pole.

It is conventional to mount a transformer on a pole by hooking it over the enlarged ends of bolts extending through the pole. However, since each transformer must be individually mounted, the economy and simplicity of this practice is applicable primarily to cases in which only one transformer is to be mounted. Also, as a practical matter, only two transformers may be so mounted in spaced apart relation about the pole.

It is also conventional to secure two or more transformers to a wooden crossarm bolted to the pole. Although this practice permits three transformers to be mounted in uniformly spaced relation for use in three phase power, it nevertheless requires a special hanger for securing each transformer to the crossarm. Furthermore, transformers mounted in this manner are distributed poorly from the standpoint of load as well as wiring.

It has more recently been proposed to mount three transformers in a cluster about a pole by means of longitudinally spaced apart pole bands of the type shown in Patent No. 2,761,643. Although these devices better distribute the load of the transformers and facilitate their wiring, they are both expensive to manufacture and difficult to install. For example, each pole band requires four arcuate clamp parts and an equal number of bolts. Furthermore, the installation of these devices not only requires that the clamps be assembled into pole bands but also that the assembled bands be accurately spaced from and substantially aligned with one another. This latter requirement is frequently complicated by knots and other irregularities in the surface of the pole.

An object of this invention is to provide apparatus for mounting transformers in a group about a pole, which is less expensive to manufacture and easier to install than the pole band devices above-mentioned.

This and other more particular objects are accomplished by means of apparatus which comprises a plate including a unitary body having a longitudinally extending curved portion for securement to a pole, and laterally extending portions at each side of the curved portion. Preferably, said longitudinally extending portion is contoured about a radius smaller than the radius of the pole to which it is to be secured, such that it may be secured thereto in prestressed relation, as will be understood more fully hereinafter. A bracket is secured to the body for supporting a transformer spaced from the outer side of the contoured portion thereof, and flanges are provided on each of the laterally extending body portions for supporting a transformer on each side of the pole. Preferably, such flanges are formed by bending over the outer ends of the laterally extending portions of the plate.

The above-described construction permits installation of the apparatus merely upon securement of the plate to the pole, and without the necessity for securing several clamps to one another and then accurately spacing and aligning the assembled pole bands, as in the case of the previously described devices of the prior art. That is, the unitary body automatically disposes the bracket and flanges in proper functional position for supporting the transformers, despite irregularities in the surface of the pole. In addition to the foregoing, the longitudinally extending contoured portion of the plate enables the load of the transformers to be distributed over a large bearing area on the pole.

Not only does this integrated construction permit ease of assembly but also there are fewer parts to fabricate, especially in the preferred construction, than in the case of the pole band devices so that it is cheaper to manufacture. This small number of parts is also of aid to the supplier and user who must stock, transport and store the apparatus in large quantity.

Each of the bracket and flanges is provided with means for supporting the entire range of distribution transformer sizes, which are normally supported on wooden poles, by utilizing appropriate transformer mounting holes.

The means on the contoured portion of the plate for securing it to the pole comprises a plurality of slots adapted to fit over and bear upon the ends of bolts extending through the pole. According to one novel concept of this invention, it is possible to employ the same bolts that were formerly used in mounting a single transformer, so that this apparatus permits a change over from a single to a multiple transformer arrangement with a minimum of effort.

In the drawings, wherein like reference characters are used throughout to designate like parts:

Fig. 1 is a rear elevational view of three transformers mounted on a pole by means of apparatus constructed in accordance with this invention;

Fig. 2 is a top plan view of the transformers and apparatus on the pole, as seen from broken line 2—2 of Fig. 1;

Fig. 3 is a side elevational view of the apparatus on the pole with the transformers removed therefrom, and as seen from broken line 3—3 of Fig. 2;

Fig. 4 is an enlarged perspective view of the apparatus detached from the pole, and as seen from the front and side thereof; and Fig. 5 is a partial view similar to Fig. 2 of a modification of the apparatus of Figs. 1 to 4.

Referring now particularly to the drawings, there is shown in each of the drawings an upright pole 10 which is mounted in the ground (not shown) for supporting a plurality of transformers A, B and C thereabove.

It should be understood that while the apparatus of this invention is particularly well suited for use in mounting distribution transformers, and thus will be described in that connection, it is contemplated that such apparatus may also be used in mounting like distribution equipment, such as static capacitors, oil circuit reclosers and instrument transformers.

Normally, these poles are wooden so that holes may be drilled therethrough for accommodating bolts 11 having enlarged heads 12 at one end and nuts 13 on the other for securing the bolts in place. As shown by the solid lines in each of Figs. 1 and 2, the transformers B and C may be a large size and the transformer A a small size. Obviously, this arrangement may be reversed, as illustrated by the broken lines of Fig. 2, or the transformers may all be of either one size or the other. In any case, each transformer is provided with a bracket 14, as shown in Fig. 2, having bolt holes therein longitudinally spaced from one another either a relatively short distance (transformer A) or a relatively long distance (transformers B and C).

The apparatus of the present invention comprises a plate 15 having a longitudinally extending curved or channel-shaped portion 16 secureable to the pole 10 and portions 17 at opposite sides of the portion 16 extending laterally therefrom in substantially opposite directions. This plate may be metal of such thickness and strength as will be found required by one skilled in the art. As previously mentioned, the portion 16 is preferably curved to a radius less than that of the pole 10. In addition to enabling this portion to be prestressed, as will be described below, this arrangement permits the plate to accommodate itself to poles of different diameters.

The outer ends of the laterally extending portions 17 of the plate are bent in a direction away from the concave side of the curved portion 16 to provide flanges 18 for supporting transformers A and C at each side of the pole. A bracket is secured to the plate for supporting transformer B spaced from the convex side of curved portion 16 of the plate, so that the three transformers are mounted in a group about the pole with the spacing between A and B being substantially the same as between B and C. Preferably, the bracket comprises a plurality of substantially U-shaped bracket elements 19 individually bolted to the plate at 20 so as to dispose the webs thereof spaced from said convex side of portion 16. As will be described more fully hereinafter, these bracket elements are secured to the plate in such longitudinally spaced apart relation that they provide a means of attachment to opposite ends of a transformer.

The means for securing the plate 15 to the pole comprises a plurality of slots 21 (Fig. 4) each of which is enlarged at its lower end 22 to permit it to be passed over the heads 12 of the through bolts 11 and curved at its upper end 23 for bearing upon the stem of the bolt. Thus, with the bolts installed in such a manner that the heads thereof project slightly outwardly from the pole so as to expose a short length of the stem, the plate may be hooked over the bolts. Obviously, the nuts 13 on the bolts may then be tightened up so as to prestress the portion 16 and cause it to bear against the pole, as shown in Fig. 2.

It is contemplated that the through bolts 11 may have already been installed in the pole for use in bolting a single transformer directly to the pole. For this reason, the slots 21 are preferably arranged and spaced apart in accordance with the means normally provided on transformers for securing them to the poles. Expressed another way, the arrangement of the slots corresponds to the means of each of the bracket elements 19 and flanges 18 for supporting a transformer therefrom. This supporting means will be seen from the drawings to comprise three longitudinally spaced apart bolt holes 24 in each flange 18 and a bolt hole 25 in the web of each bracket element 19, with such elements being secured to the plate 15 so as to space the holes 25 correspondingly to the holes 24.

Thus, when a transformer such as A is to be supported from a flange of the apparatus of this invention, its bracket 14 is bolted as at 26 to the upper two of the bolt holes 24 therein. On the other hand, when a transformer such as C is to be supported from a flange, it is bolted as at 27 to the outermost bolt holes 24 thereof. Similarly, when a transformer such as B is to be supported from the bracket, it is bolted as at 28 to the bolt holes 25 in the outermost bracket elements. If, on the other hand, a transformer such as A were to be supported from the bracket, one or the other bracket elements 19 would be replaced by an intermediate element 19 shown in broken lines in Fig. 3.

Inasmuch as the preferred arrangement of the slots 21 corresponds to the above-described bolt hole arrangement, it will be understood that the upper and lower slots are spaced apart a distance to permit them to be hooked over bolts 11 disposed through the pole for securing a transformer such as B or C thereto. Obviously, the upper two slots may be spaced apart a distance for hooking over bolts extending through the pole for securing a transformer such as A thereto.

Although reference has heretofore been made to using the upper two of the bolt holes and slots in the case of installing transformer A, it is possible to use the lower two instead as the spacing between bolt holes in the brackets 14 of transformers B and C is twice that of transformer A. It is also obvious that when all of the transformers to be mounted are such as B and C, one end of the plate 15 and the bracket element secured thereto may be cut off so as to reduce the weight of the apparatus.

Furthermore, although the apparatus has been described above as being installed by hooking over bolts in place through the pole 10, it is obvious that the apparatus and through bolts may, if desired, be installed simultaneously. That is, the through bolts may be extended through the pole and slots 21 and then tightened thereon as the plate 15 is held in place against the pole. Likewise, it is possible to support the transformers on the apparatus either before or after it has been secured to the pole. Holes 30 may be provided through the upper portion of the plate to accommodate sling lines for hoisting the apparatus, and holes 31 may be provided through the lower portion thereof for accommodating ground lug attachments.

The outermost ends of the flanges 18 are bent to form reinforcing ribs 29 thereon. Since, as shown in the drawings, these ribs are bent outwardly away from the curved portion 16 of the body, they do not interfere with stacking of the plates when the bracket elements are removed therefrom.

If desired, the above-described apparatus may be provided with greater load-bearing capacity by means of a backstrap 32. As indicated in Fig. 5, this backstrap comprises a plate having a longitudinally extending portion 33 secureable to a side of the pole 10 opposite the portion 16 of plate 15 and laterally extending portions 34 on both sides of portion 33. These portions 34 are bent in a direction away from the concave side of portion 33 to provide flanges 35 for securement to the flanges 18 of the plate 15.

As can be seen from Fig. 5, the portion 33 is, similarly to portion 16, curved to a radius less than the pole and secured thereto by the through bolts 11, so that it may be prestressed when the latter are tightened. The flanges 35 are secured to the flanges 18 by means of the bolts 26 and 27.

Although in the illustrated embodiment of the invention, the transformers are bolted directly to the plate, it is obvious that adapters or the like may be attached to the plate for mounting transformers having means of attachment other than the brackets 14.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. For use in mounting transformers or the like in a group about a pole, apparatus comprising a longitudinally extending portion for securement to a pole, portions fixed with respect to the longitudinally extending portion and extending laterally from opposite sides thereof, said longitudinally extending portion being substantially channel-shaped and having means for receiving parts to secure one face thereof to the pole with laterally spaced apart lines thereon bearing against said pole, a bracket secured with respect to said longitudinally and laterally extending portions for supporting a transformer spaced from the opposite face of the longitudinally extending portion, and flanges fixed with respect to the outer ends of the laterally extending portions and extending therefrom in substantially the same direction as the one face faces for supporting additional transformers on opposite sides of the pole, said flanges extending substantially the length of the longitudinally extending portion, and each of said bracket and flanges having longitudinally spaced apart means to which said transformers may be attached.

2. Apparatus of the character defined in claim 1, wherein said longitudinally extending portion, said laterally extending portions and said flanges are formed by an integral plate.

References Cited in the file of this patent

UNITED STATES PATENTS

| | | |
|---|---|---|
| 1,014,471 | Herold | Jan. 9, 1912 |
| 1,867,394 | Acly | July 12, 1932 |
| 2,058,611 | Merkle | Oct. 27, 1936 |
| 2,114,876 | Forbes | Apr. 19, 1938 |
| 2,333,519 | Callander | Nov. 2, 1943 |
| 2,761,643 | Ward et al. | Sept. 4, 1956 |